Dec. 30, 1969  J. M. EASTMAN  3,486,416

FLUID REMOTE POSITION INDICATOR

Filed Feb. 8, 1968  2 Sheets-Sheet 1

INVENTOR.
JAMES M. EASTMAN
BY
Plante, Arens, Hartz & O'Brien
ATTORNEYS

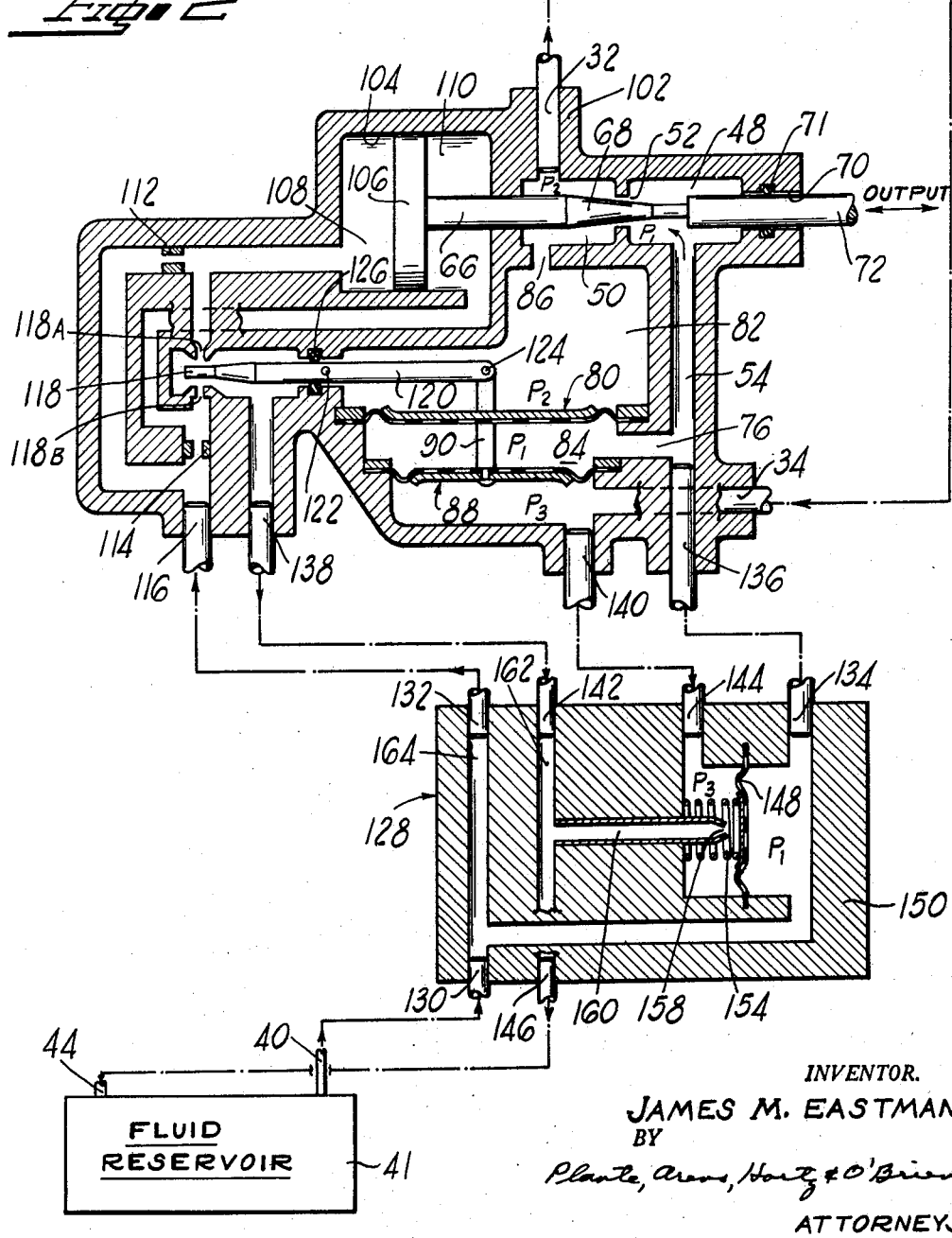

United States Patent Office 3,486,416
Patented Dec. 30, 1969

3,486,416
FLUID REMOTE POSITION INDICATOR
James M. Eastman, South Bend, Ind., assignor to The Bendix Corporation, a corporation of Delaware
Filed Feb. 8, 1968, Ser. No. 704,078
Int. Cl. F15b 13/02
U.S. Cl. 91—47                                    7 Claims

ABSTRACT OF THE DISCLOSURE

A fluid remote position indicator having a first housing with valve means for sensing input variations and connected thereto is a second housing remotely located having a fluid supply and return containing a pressure responsive means for controlling a servo valve which causes another valve means with an output attached thereto to respond to input variations.

BACKGROUND OF THE INVENTION

The invention concerns an improvement to remote fluid position indicators of the variety generally used in gas turbine engines where the input sensing element is located in the engine environment and the output work accomplishing element is remotely located elsewhere in the aircraft. However, it is felt that the invention may be used for any application where remote position indication is required.

The conventional remote position indicators with which I am familiar consist mainly of bulky mechanical schemes such as wire through a conduit or a series of linkages all of which suffer degradation in a high temperature environment and are further subject to error or in-service failures due to deformations received during installation, use or maintenance. These devices also require complicated mechanisms for developing a mechanical advantage with which to do work in response to the input without loading same. Additionally, remote fluid position indicators are generally susceptible to error resulting from differences in fluid properties (e.g., differences in density or viscousity of jet fuels) and loss of fluid by leakage in sealed systems. Moreover, they usually require careful zeroing adjustments during installation. These undesirable attributes of existing remote position indicators result in unreliable and hazardous aircraft flights.

SUMMARY OF THE INVENTION

It is the purpose of this invention to provide a fluid remote position indicator whose input responsive element is small enough to function in its intended environment having a complementing element remotely located for responding to input variations and thereby accomplishing work. The accuracy of the invention will be consistent regardless of increases or decreases in the ambient temperature of its operating environment. Fluid loss will not introduce errors in this device since it is not a sealed fluid system. Further, this invention will not require delicate zeroing adjustments during installation. This fluid remote position indicator will provide sufficient power amplification so that the output can be made to do work without developing significant error or loading of the input member. Additionally, this invention will perform reliably in its use environment.

Other objects and features of the invention will be apparent from the following description of the fluid remote position indicator taken in connection with the accompanying drawings.

BRIEF DESCRIPTION OF THE DRAWINGS

FIGURE 2 is a sectional schematic similar to FIGURE 1, illustrating a modified form of the invention.

DESCRIPTION OF THE PREFERRED EMBODIMENTS

Figure 1:
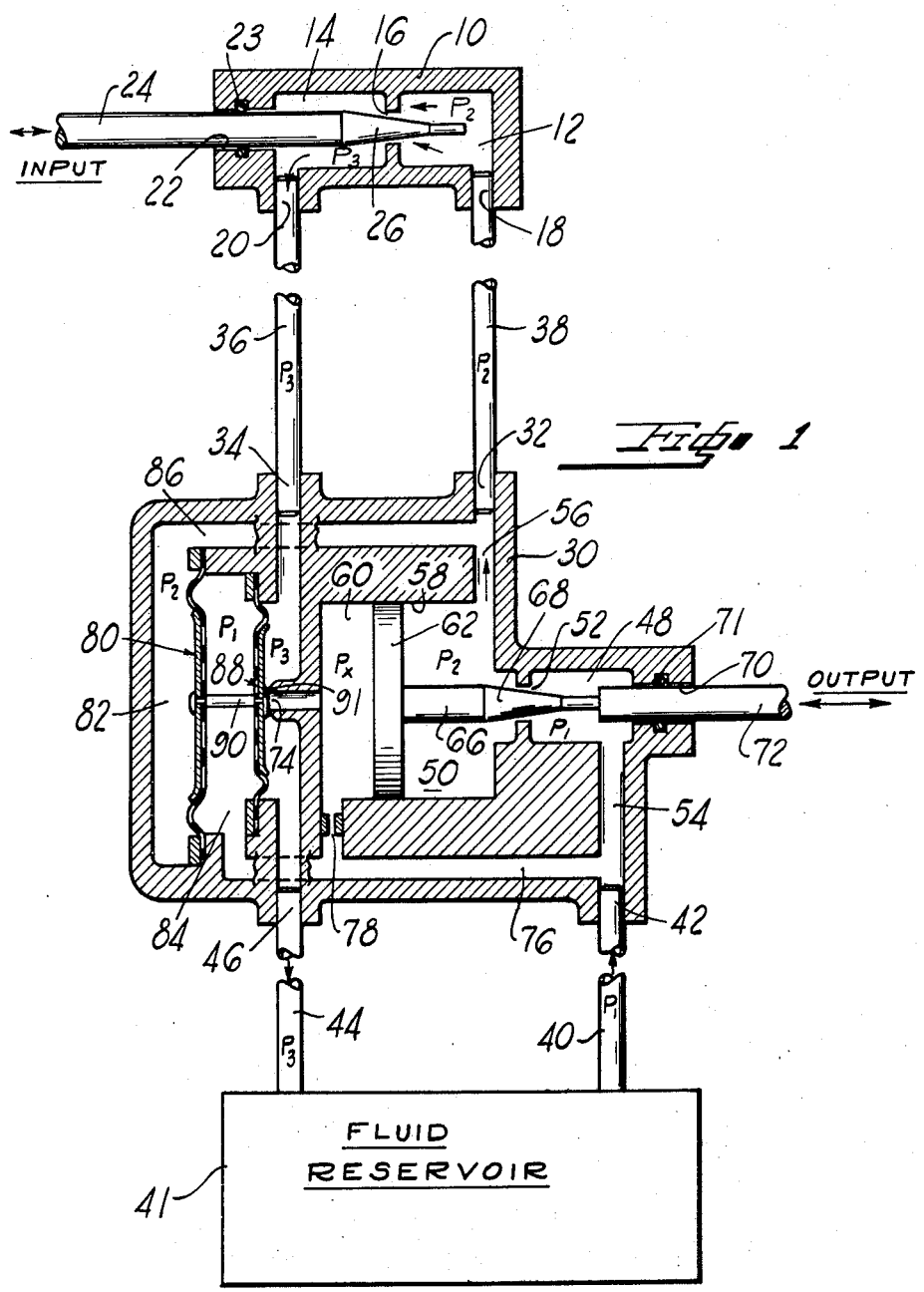
FIGURE 1 is a sectional schematic of the components comprising the fluid remote position indicator.

Referring now to the drawings and particularly to FIGURE 1, illustrating the preferred embodiment of the invention, a first housing is indicated by reference numeral 10 and is rigidly fixed to a gas turbine engine installed in an aircraft, not shown. The first housing 10 is by designed relatively small to facilitate its use in the smaller space space allocations available in some sections of the engine compartment. Further, its physical properties are such that it can withstand the vibration and shock characteristics of the engine compartment environment.

The first housing 10 has disposed therein fluid chambers 12 and 14 separated by a first orifice 16. Fluid chamber 12 receives fluid pressure $P_2$ through fluid inlet 18. Fluid chamber 14 vents fluid pressure $P_3$ through fluid outlet 20. The first housing 10 has an opening 22 adjacent fluid chamber 14 with an annular seal 23 disposed therein which slidingly and sealingly receives valve stem 24. Valve stem 24 is responsive to a variable input (as indicated by the arrow) to position valve 26 and thereby control the effective flow area of the first orifice 16 as a function of the variable input.

A second housing 30 being of a larger volume than the first housing 10 is remotely located relative to the first housing 10. The second housing 30 has a fluid inlet 34 and outlet 32 connected to the fluid outlet 20 and inlet 18, respectively, of the first housing through fluid passages 36 and 38.

The second housing 30 receives pressurized fluid from a reservoir 41, at a fluid pressure $P_1$, via passage 40 and inlet opening 42 and vents, at a fluid pressure $P_3$, through outlet opening 46 to the fluid return 44 of the fluid reservoir 41. Fluid pressure $P_1$ is a substantially constant controlled pressure.

The second housing 30 has therein fluid chambers 48 and 50 which are separated by a second orifice 52. Fluid chamber 48 receives fluid at pressure $P_1$ through fluid passage 54. Fluid chamber 50 vents fluid at pressure $P_2$ through fluid passage 56 to fluid outlet 32. The second housing 30 has therein a cylindrical cavity 58 comprised of variable volume fluid chambers 50 and 60 separated by the fluid pressure responsive means 62 which is slidingly and sealingly received by the cylindrical cavity 58. Valve stem 66 is at one end rigidly secured to fluid pressure responsive means 62 and has at the other end attached thereto valve 68. Valve stem 66 is responsive to movement of the fluid pressure responsive means 62 to position valve 68 and thereby control the effective flow area of the second orifice 52. The second housing 30 has an opening 70 adjacent fluid chamber 48 with an annular seal 71 disposed therein which slidingly and sealingly receives output shaft 72 which is rigidly fixed to valve 68.

Fluid chamber 60 has opposite the wall of the fluid pressure responsive means 62, a servo valve orifice 74 for controlling fluid flow out of, and thus the fluid pressure in said chamber. Fluid chamber 60 receives fluid supply through fluid passage 76 and a fluid passage restriction 78. Said orifice 74 and said restricted passage 78 provide a servo pressure $P_x$ within said chamber 60 as a function of the effective flow area of orifice 74.

A first fluid pressure responsive member 80 separates fluid chambers 82 and 84. Fluid chamber 82 receives fluid pressure $P_2$ through fluid passage 86 which joins fluid passage 56. Fluid chamber 84 receives fluid pressure $P_1$ through fluid passage 76 which joins fluid passage 54. A second fluid pressure responsive member 88 exposed to fluid chamber 84 and fluid return pressure $P_3$ is operatively connected with the first fluid pressure responsive member 80 in a force-opposing relationship. Although other techniques can be used, the fluid pressures responsive members 80 and 88, as will be recognized by those skilled in the art, may be rigidly connected by a shaft 90 having an integral servo valve 91 which cooperates with orifice 74. Further, the servo valve 91 will be positioned intermediate a full open position and a full closed position relative to the orifice 74 when the fluid system is nulled. The first fluid pressure responsive member has a predetermined effective area ratio relative to the second fluid pressure responsive member of two to one. It is noted that the predetermined effective area ratio need not always be two to one. Design alterations can be made to the valves and orifices to facilitate ratios other than two to one. Further, the first and second fluid pressure responsive members are flexible rubber diaphragms, although other means could be used.

The valves 26 and 68 and their respective orifices 16 and 52 are identical and their pressure drops $P_1-P_2$ and $P_2-P_3$ are equal such that a fluid system null will be obtained with the same opening of each. Since the diaphragm 80 senses the pressure drop $P_1-P_2$ across the valve 68 and is opposed by diaphragm 88 having half as much effective area and sensing the total fluid supply pressure differential $P_1-P_3$, the diaphragm forces are in balance, when $P_1-P_2=\frac{1}{2}(P_1-P_3)$. Therefore, $$P_1-P_2=P_2-P_3$$

Consequently, the second valve 68 motion always duplicates the motion of the first valve 26 and thus the output shaft position duplicates the input shaft position. Since pressure drops across the valves, and valve configurations are always identical, whether the flow is turbulent or laminar, whether or not supply pressure differential varies, or whether or not fluid viscosity and density change, the matching of output with input positions is essentially always retained as long as there is enough supply differential to overcome output loads. Moreover, it is noted that this device provides remote position indication with power amplification so that the output can be made to do work without developing significant error or loading the input member.

MODE OF OPERATION OF THE PREFERRED EMBODIMENT

Assuming the closed loop fluid system is nulled; the output shaft 72 and second valve 68 are duplicating the first valve 26 and input relative to their respective orifices 52 and 16. Further, the pressure drop $P_1-P_2$ across valve 68 is equal to the pressure drop $P_2-P_3$ across valve 26. The first valve 26 will respond to a variable input. Upon the application of an input force to completely or partially close the valve 26 relative to the orifice 16, the pressure differential $P_2-P_3$ across said valve will increase in relation to pressure differential $P_1-P_2$, since valve 26 will provide a smaller area than valve 68 for the same flow.

The first fluid pressure responsive diaphragm 80, sensing pressure differential $P_1-P_2$, and the opposing second fluid pressure responsive diaphragm 88, sensing pressure differential $P_1-P_3$, operatively connected together, will react to close the servo valve 91. The servo pressure $P_x$ within fluid chamber 60 will increase, exerting pressure on fluid pressure responsive means 62 to move the same so as to position valve 68 relative to orifice 52 until $P_1-P_2=P_2-P_3$. When $P_1-P_2=P_2-P_3$, the fluid system is again at null and the pressure differential across valves 26 and 68 is the same as well as their positions relative to orifices 16 and 52 respectively, being identical.

Upon an input to completely or partially open the valve 26 relative to the orifice 16 the fluid pressure responsive diaphragms will cooperate to open the servo valve 91 decreasing the pressure $P_x$ and thereby $P_2$ will exert pressure to move the fluid pressure responsive means 62 until the position of valve 68 relative to orifice 52 provides a system null.

DESCRIPTION OF THE MODIFIED EMBODIMENT

In the embodiment shown in FIGURE 2, those parts which are identical to corresponding parts of the preferred embodiment, depicted in FIGURE 1, will be given the same identifying numbers.

In the embodiment of FIGURE 2, a second housing 102 having therein a cylindrical cavity 104, slidably receives a fluid pressure responsive means 106 thereby dividing said cylindrical cavity into variable volume fluid chambers 108 and 110. Fluid chambers 108 and 110 communicate via restricted passages 112 and 114, respectively, with a supply passage 116 communicating with fluid reservoir 41.

Servo valve 118 is interposed between valve orifices 118A and 118B having fluid connections with restricted passages 112 and 114, respectively, downstream from the associated restrictions therein. The fluid pressures in chambers 108 and 110 are controlled by the position of the servo valve 118 relative to the orifices 118A and 118B as will be understood by those persons skilled in the art.

A lever 120 integral with servo valve 118 is pivotally supported on a pin 122 secured to housing 102 intermediate the servo valve 118. The end of lever 120 is pivotally secured by a pin 124 to a shaft rigidly affixed to the fluid pressure responsive diaphragms 80 and 88. Thus, the actuating member 120 is operatively attached to the fluid pressure responsive diaphragms 80 and 88 to provide for control of servo valve 118 by said fluid pressure responsive members. The housing 102 is suitably recessed to accommodate a resilient seal 126 providing a seal against fluid leakage between housing 102 and lever 120.

The orifices 118A and 118B and the passage restrictions 112 and 114 are selected to provide preselected pressures within chambers 108 and 110 respectively, as a function of fluid supply 40 and fluid return 44 pressures with said servo valve 118 positioned equal distance from each orifice.

As previously recited in connection with the preferred embodiment, power amplification is required to accomplish the output work. Likewise, power amplification is desired for the modified embodiment; however, provisions can be made to operate the sensing circuit at a significantly lower pressure drop and thereby effect a savings in terms of fluid power.

It will be apparent to those skilled in the art, that the addition of valve stroke multiplying or dividing devices on the output and/or input members to optimize valve stroke to the desired input and output strokes, and that the use of different differential pressure sensors or different styles of servo valves and actuators could all fall within the spirit and scope of this device.

Specifically, with regard to the design of the modified embodiment, it is desirable to obtain further fluid remote position indicator accuracy by employing reasonably large size valves and moving the valves through a rather long stroke. Additionally, this would greatly reduce the precision normally required in making valves for this type application. However, by enlarging the valves and increasing their throws, the amount of fluid power consumed in the sensor circuit, across the valves 26 and 68, would be excessively large; and thus inefficient, if $P_1/P_3$ is large enough to provide adequate servo power to enable the output to do work. Since $P_1-P_3$ need not be nearly as large for accurate sensing and matching of $P_1-P_2$ and $P_2-P_3$, fluid power consumption is markedly reduced by providing a separate low pressure differential fluid supply to the sensor circuit. It is noted that the modified embodiment can function on a single fluid supply and return with or without a separate low pressure differential fluid supply to the sensor circuit. Further, said modified embodiment can function on separate fluid supplies and returns to the sensor and servo circuits employing the same or different fluids. Where, for the modified embodiment, the same fluid is used, FIGURE 2 shows how a low pressure differential supply for sensing can be tapped from the fluid supply by using a throttling head regulator valve.

The modified embodiment further may have fluid pressure control mechanism 128 in series between the second housing 102 and the fluid reservoir 41. Said fluid pressure mechanism 128 receives fluid supply 40 through fluid opening 130 and vents fluid pressure $P_1$ through openings 132 and 134 and passages to openings 116 and 136 respectively, of the second housing 102. The second housing 102 is vented through openings 138 and 140 to the fluid pressure control mechanism openings 142 and 144, respectively. The fluid pressure control mechanism 128 vents fluid pressure through opening 146 to the fluid reservoir.

The fluid pressure control mechanism 128 provides a high pressure supply for said servo valve 118 and a low pressure differential supply for the sensor circuit. The low pressure differential supply is comprised of a pressure responsive diaphragm 148 suitably attached at its radially outermost portion to housing 150 of control mechanism 128 and is subjected to fluid supply pressure $P_1$ on one side and fluid return pressure $P_3$ on the other. Spring means 154 interposed between housing 150 and diaphragm 148 serves to preload diaphragm in opposition to pressure $P_1$. The pressure responsive diaphragm 148 and the spring means 154 operatively cooperate to regulate the fluid return flow through orifice 158 and thereby provide a separate low pressure differential fluid supply to the sensor circuit. The orifice 158 vents fluid through fluid passage 160 which intersects fluid passage 162 returning the fluid to the fluid reservoir 41. The high pressure servo supply is provided from the fluid supply 40 through the fluid pressure passage 164 to second housing opening 116. The associated fluid return vents through second housing opening 138 and flows through fluid pressure passage 162 to fluid return 41.

MODE OF OPERATION OF MODIFIED EMBODIMENT

Assuming the closed loop fluid system is nulled; the output shaft 72 and second valve 68 are duplicating the first valve 26 and input relative to their respective orifices 52 and 16. Further, the pressure drop across valve 68 is equal to the pressure drop across valve 26. The first valve 26 will respond to a variable input. Upon the application of an input force to completely or partially close the valve 26 relative to the orifice 16, the pressure differential $P_2-P_3$ across said valve will increase in relation to pressure differential $P_1-P_2$.

The first fluid pressure responsive diaphragm 80, sensing pressure differential $P_1-P_2$, and the opposing second fluid pressure responsive diaphragm 88, sensing pressure differential $P_1-P_3$, operatively connected together, will react to cause valve 118 to partially close orifice 118A and by the same amount open orifice 118B. The servo pressure within fluid chamber 108 will increase exerting pressure on fluid pressure responsive means 106 to move same so as to position valve 68 relative to orifice 52 until the pressure $P_1-P_2$ drop thereacross is equivalent to pressure drop $P_2-P_3$ across valve 26 whereupon the fluid system is again at null.

It is understood that an input to completely or partially open the valve 26 will result in an identical converse action.

I claim:
1. A fluid remote position indicator comprising:
   a first valve responsive to a variable input,
   a first housing defining a flow passage having a fluid inlet and outlet,
   a first orifice in series flow relationship with said inlet and outlet for controlling the effective flow area of said passage,
   said first valve being operatively connected to said first orifice for varying the effective flow thereof as a function of the variable input,
   a second housing remotely located relative to said first housing and having a fluid inlet and outlet connected to the fluid outlet and inlet, respectively, of the first housing through fluid passages,
   said second housing having fluid supply under pressure and fluid return at a pressure lower than the fluid supply,
   a second orifice in series flow relationship with said fluid supply and said second housing outlet,
   a second valve operatively connected to said second orifice for varying the effective flow area thereof,
   a first fluid pressure responsive member responsive to the pressure differential across said second orifice,
   a second fluid pressure responsive member responsive to the pressure differential across both said orifices,
   said first and second fluid pressure responsive members being operatively connected together in force-opposing relationship and having a predetermined effective area ratio,
   a third fluid pressure responsive means operatively connected to said second valve for actuating same, and
   a servo valve means for controlling the differential fluid pressure to which said third fluid pressure responsive means responds,
   said first and second fluid pressure responsive members operatively connected to said servo valve means for actuating same,
   said first and second fluid pressure responsive members being operative to actuate said servo valve means to control the position of said third pressure responsive means and thus the position of said second valve to thereby establish a pressure differential across said second orifice related to the pressure differential across said first orifice in accordance with said predetermined area ratio,
   said second housing having an output means operatively connected to said third fluid presure responsive means thereby duplicating the variable response of said first valve and the input.

2. A fluid remote position indicator as recited in claim 1, wherein the said first and second valves are of a predetermined design such that the pressure drops thereacross and positions thereof are identical when the output duplicates the input.

3. A fluid remote position indicator as recited in claim 1, which further comprises:
   a cylindrical cavity within said second housing slidingly receiving said third fluid pressure responsive means with which said cylindrical cavity defines a variable volume fluid chamber,
   said servo valve means comprising an orifice in fluid flow communication with said variable volume chamber,
   a member operatively connected to said first and second fluid pressure members and coacting with said orifice to thereby control the fluid pressure in said variable volume chamber,
   said variable volume chamber having communication with said fluid supply via a restriction upstream of said orifice,
   said orifice and said restriction are predetermined to provide a preselected servo pressure within said chamber as a function of fluid supply and fluid return pressures and the position of said member in relation to said orifice,
   said member remaining in an intermediate position in relation to said orifice when said second valve duplicates the position of said first valve, a fluid pressure drop across said second valve that is larger than a fluid pressure drop across said first valve will cause said fluid pressure responsive members to respond by opening said servo valve member in relation to said orifice thereby dropping the servo pressure and causing said third fluid pressure responsive means to open said second valve causing the fluid pressure drop across said second valve to decrease until it is equal to the fluid pressure drop across said first valve.

4. A fluid remote position indicator as recited in claim 1, wherein said first and second fluid pressure responsive members comprise:

said first and second fluid pressure responsive members being rigidly connected together,
said fluid pressure responsive members being flexible rubber or metal diaphragms,
said fluid pressure responsive members sensing the pressure drops across said first and second valves to thereby determine direction and length of travel of said fluid pressure responsive members necessary to close or open said servo valve in controlling said third fluid pressure responsive means in response to an input variation.

5. A fluid remote position indicator as recited in claim 1, which comprises:

a cylindrical cavity within said second housing slidingly and sealingly receiving said third fluid pressure responsive means thereby dividing said cylindrical cavity into first and second variable volume fluid chambers,
said first fluid chamber receiving said fluid supply through a fluid passage restriction,
said second fluid chamber receiving said fluid supply through a fluid passage restriction,
said fluid passage restrictions being identical,
a double orifice servo valve with one orifice receiving fluid pressure from said first chamber and the other orifice receiving fluid pressure from said second chamber,
said servo valve orifices being of a predetermined design and venting to said fluid return,
said servo valve having an actuating member operatively disposed between said orifices to regulate fluid pressures in said variable volume fluid chambers,
said actuating member being operatively attached to said first and second fluid pressure responsive members to thereby provide for control of said servo valve by said fluid pressure responsive members,
said servo valve orifices and said passage restrictions are of a predetermined design to provide a preselected pressure within said chambers as a function of fluid supply and fluid return pressures with said actuating member positioned equal distance from each orifice,
a fluid pressure drop across said second valve that is larger than a fluid pressure drop across said first valve will cause said fluid pressure responsive members to respond by further opening servo valve orifice controlling the fluid pressure of said first chamber thereby lowering the fluid pressure of said first chamber resulting in said third fluid pressure responsive means opening said second valve causing the fluid outlet pressure of said second housing to increase until the fluid pressure drop across said second valve is equal to the fluid pressure drop across said first valve.

6. A fluid remote position indicator as recited in claim 1, wherein the fluid supply and fluid return comprises:

a fluid supply under pressure provided to said second valve of said second housing and said orifices of said second housing,
a first fluid return from said second housing to a point of pressure lower than the fluid supply,
means operatively connected between said fluid supply and said first fluid return for providing a low pressure differential therebetween,
a second fluid return from said orifices connecting with said first fluid return downstream from said low pressure differential means.

7. A fluid supply and fluid return as recited in claim 6, wherein the means operatively connected between said fluid supply and said first fluid return comprise:

a diaphragm operatively connected to an orifice, said diaphragm receiving pressure from said fluid supply on one side and said pressure being opposed on the other side of said diaphragm by said first fluid return pressure and a spring of a predetermined pressure to thereby establish a predetermined low pressure differential between said fluid supply and said first fluid return.

References Cited

UNITED STATES PATENTS

| 2,564,108 | 8/1951 | Holley | 91—388 |
| 2,989,950 | 6/1961 | Lockman | 91—388 |
| 3,040,715 | 6/1962 | McCombs et al. | 91—388 |

FOREIGN PATENTS

PAUL E. MASLOUSKY, Primary Examiner

U.S. Cl. X.R.

91—51, 388, 396, 461